US009941925B1

(12) United States Patent
Chávez

(10) Patent No.: US 9,941,925 B1
(45) Date of Patent: Apr. 10, 2018

(54) COMMUNICATION SYSTEM SUPPORTING HIGH-PRECISION MEASUREMENTS UTILIZING REFERENCE SEQUENCE RE-MODULATION

(71) Applicant: Rockwell Collins, Inc., Cedar Rapids, IA (US)

(72) Inventor: Carlos J. Chávez, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 72 days.

(21) Appl. No.: 14/186,046

(22) Filed: Feb. 21, 2014

(51) Int. Cl.
    *H04B 1/709*     (2011.01)
    *G06F 11/07*     (2006.01)
    *G01S 5/02*     (2010.01)

(52) U.S. Cl.
CPC ............ *H04B 1/709* (2013.01); *G01S 5/0221* (2013.01); *G06F 11/0751* (2013.01)

(58) Field of Classification Search
CPC ........ G01S 5/02; G01S 5/0215; G01S 5/0221; G06F 11/0751; H04B 1/709; H04W 64/00
See application file for complete search history.

(56) References Cited

U.S. PATENT DOCUMENTS

| 5,973,643 | A * | 10/1999 | Hawkes | G01S 1/045 342/457 |
|---|---|---|---|---|
| 6,285,321 | B1 * | 9/2001 | Stilp et al. | 342/465 |
| 6,430,166 | B1 * | 8/2002 | Bejjani | H04B 1/7113 370/320 |
| 6,459,903 | B1 * | 10/2002 | Lee | H04W 64/00 342/457 |
| 9,070,236 | B1 * | 6/2015 | DiEsposti | G07C 5/0808 |
| 2006/0104387 | A1 * | 5/2006 | Sahinoglu | H04B 1/7183 375/340 |
| 2006/0262011 | A1 * | 11/2006 | Bull et al. | 342/357.06 |
| 2007/0155489 | A1 * | 7/2007 | Beckley et al. | 463/29 |
| 2008/0158050 | A1 * | 7/2008 | Levy | G01S 19/235 342/357.62 |
| 2009/0262700 | A1 * | 10/2009 | Franceschini et al. | 370/330 |
| 2009/0285326 | A1 * | 11/2009 | Lablans | H04J 13/105 375/286 |
| 2010/0158076 | A1 * | 6/2010 | Snlyely et al. | 375/130 |
| 2010/0220011 | A1 * | 9/2010 | Heuser | G01S 5/0273 342/386 |
| 2010/0260207 | A1 * | 10/2010 | Simmons | 370/503 |
| 2011/0025562 | A1 * | 2/2011 | Hol | G01S 5/0247 342/387 |
| 2013/0324154 | A1 * | 12/2013 | Raghupathy et al. | 455/456.1 |
| 2015/0215821 | A1 * | 7/2015 | Zhang et al. | H04W 28/18 |

* cited by examiner

*Primary Examiner* — David B. Lugo
(74) *Attorney, Agent, or Firm* — Angel N. Gerdzhikov; Donna P. Suchy; Daniel M. Barbieri

(57) ABSTRACT

Reference sequence re-modulation techniques and systems are disclosed. A communication system includes a communication data path having a demodulation module configured to demodulate a modulated signal. The system also includes a re-modulation module configured to receive an output message from the communication data path and re-modulate the output message to produce a re-modulated reference sequence. Such a re-modulated reference sequence supports generation of high-precision position, navigation, and timing (PNT) measurements without imposing additional reference sequence overhead on the communication system.

12 Claims, 3 Drawing Sheets

COMMUNICATION SYSTEM SUPPORTING HIGH-PRECISION MEASUREMENTS UTILIZING REFERENCE SEQUENCE RE-MODULATION

TECHNICAL FIELD

The present disclosure relates generally to signal processing, and more particularly to signal processing in communication systems.

BACKGROUND

In communication systems, modulation refers to a process of conveying a message signal, for example a digital bit stream or an analog signal, inside another signal that can be physically transmitted. A modulator is a device that performs modulation. A demodulator is a device that performs demodulation, the inverse of modulation, on the receiving end of a communication system. Demodulation is the act of extracting the original information-bearing signal from a modulated signal.

SUMMARY

The present disclosure is directed to a communication apparatus. The communication apparatus includes a communication data path having a demodulation module configured to demodulate a modulated signal received at the communication apparatus. The communication apparatus also includes a re-modulation module configured to receive an output message from the communication data path and re-modulate the output message to produce a re-modulated reference sequence.

Another embodiment of the present disclosure is directed to an integrated communication and position, navigation, and timing (PNT) measurement system. The system includes a communication data path having a demodulation module configured to demodulate a modulated signal. The system also includes a re-modulation module configured to receive an output message from the communication data path and re-modulate the output message to produce a re-modulated reference sequence. The system further includes an estimation module configured to estimate at least one PNT measurement based on the modulated signal and the re-modulated reference sequence produced by the re-modulation module.

A further embodiment of the present disclosure is directed to a signal processing method. The signal processing method includes receiving a modulated input signal; demodulating the modulated input signal to produce a demodulated output signal; and re-modulating the demodulated output signal to produce a re-modulated reference sequence.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Integrating communication functionalities with high-precision measurements that support position, navigation, and timing (PNT) into a single system is desirable. Such an integrated system provides advantages of reduced size, weight, power, and cost over the conventional separation between communication and PNT functions. Additionally, an integrated communication and PNT system can maintain operation in scenarios where conventional solutions for high-precision PNT (e.g., global positioning system, or GPS) are denied.

However, there is a conflict between communication and high-precision PNT measurements regarding reference sequences. That is, in a typical communication system, reference sequences (known to the intended receiver) are included in a transmission to facilitate acquisition and synchronization at the receiver. In order to minimize overhead inefficiency, these reference sequences are sufficient only for communication purposes. As a result, these reference sequences are not long enough to produce high-precision PNT measurements such as precise time-of-arrival (TOA), precise frequency-of-arrival (FOA), precise angle-of-arrival (AOA), or the like.

The present disclosure is directed to reference sequence re-modulation techniques for integrated communication and PNT systems. Such a reference sequence re-modulation technique supports generation of high-precision PNT measurements without imposing additional reference sequence overhead on a communication system.

Figure 1:
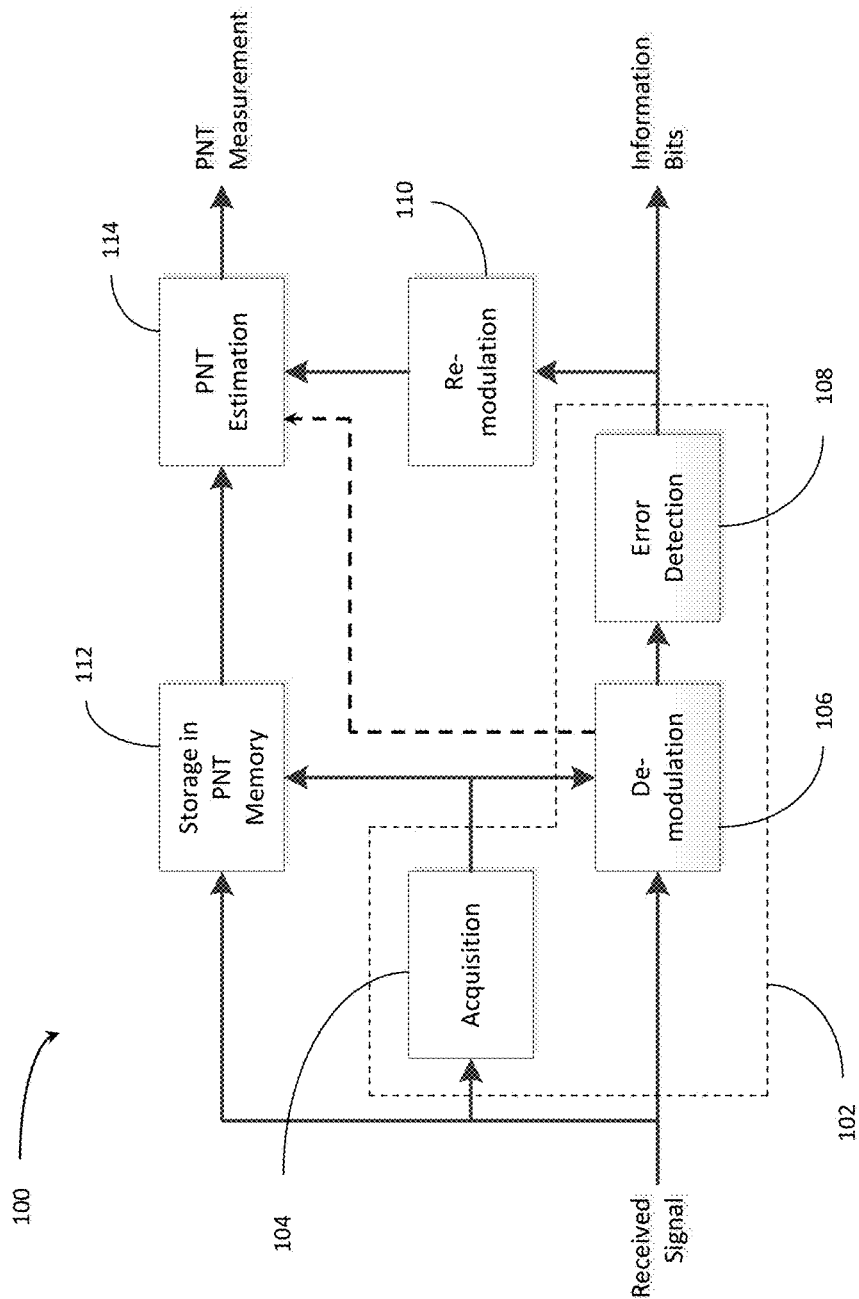
FIG. 1 is a block diagram depicting an integrated communication and position, navigation, and timing (PNT) system.

Referring to FIG. 1, a block diagram depicting an integrated communication and PNT system 100 utilizing the reference sequence re-modulation technique is shown. As illustrated in FIG. 1, a received signal is processed by a communication data path 102 to produce the original information-bearing signal (data bits) for communication purposes. It is contemplated that the communication data path 102 may include various components utilized in a typical communication system.

For instance, in one embodiment, the communication data path 102 includes a signal acquisition module 104 configured to detect the presence of a desired signal and estimate initial parameters for timing and carrier synchronization. The communication data path 102 also includes a demodulation module 106 (may also be referred to as a demodulator) configured to recover the information content from the received signal. An error detection module 108 (e.g., cyclic redundancy check or the like) may also be utilized to detect any uncorrected errors that may have occurred during the transmission of the signal to provide the output of the communication data path 102. It is noted that error correction (e.g., forward error correction such as Reed-Solomon codes, convolutional codes, turbo codes and the like) is part of demodulation. The purpose of error detection (provided by the error detection module 108) is to catch and discard any messages that include errors that made it through demodulation. This prevents corrupted messages from making it out of the communication system.

Since the communication messages include reference sequences sufficient only for communication purposes (i.e., acquisition and synchronization sufficient for demodulation and decoding), additional processing is needed in order to produce a much longer reference sequence to satisfy the precision requirement for PNT measurement purposes. In accordance with the present disclosure, a successfully demodulated and decoded communication message is re-modulated to produce such a reference sequence for PNT measurement.

More specifically, a re-modulation module 110 that implements the same modulation process as the modulator that originally modulated the received signal is utilized to re-modulate the successfully demodulated and decoded communication message. The re-modulated reference sequence can then be correlated with the received signal stored in a storage device 112 (e.g., a memory, a buffer or the like) by the PNT estimation module 114 to produce high-precision PNT measurements. In this manner, high-precision PNT measurements can be supported without imposing additional reference sequence overhead on the communication system.

It is contemplated that the PNT estimation module 114 may be configured to provide a variety of measurements based on the re-modulated signal received from the re-modulation module 110 and the signal as received stored in the storage device 112. Such measurements may include, but not limited to, time-of-arrival (TOA), frequency-of-arrival (FOA), angle-of-arrival (AOA) and the like. It is understood that the specific implementation of the PNT estimation module 114 may vary and existing PNT estimation devices may be utilized without departing from the spirit and scope of the present disclosure, as long as the reference signal provided to the PNT estimation module 114 is a re-modulated communication message as described above.

It is also contemplated that additional and/or optional input parameters may be provided by the demodulation module 106 to the PNT estimation module 114. For instance, certain demodulators may be able to determine parameters such as a time-of-arrival, a frequency-of-arrival, an angle-of-arrival, and/or a phase-of-arrival based on the reference sequence for the communication message. These parameters determined by the demodulator are considered coarse for PNT purposes, but they can still be provided to the PNT estimation module 114 as optional parameters. These coarse estimates can simplify PNT estimation by bounding the possible values of the parameters to be precisely estimated. This can be particularly helpful when jointly estimating parameters that may interact, such as time-of-arrival and frequency-of-arrival.

Furthermore, it is contemplated that the re-modulation process is not limited to re-modulate one communication message at a time. Multiple sequential communication messages (successfully received) may be re-modulated jointly and used as a single large reference sequence for PNT estimation. It is understood that the specific number of sequential communication messages that can be re-modulated jointly at a time may be determined based on the available memory size provided by the storage device 112.

Figure 2:
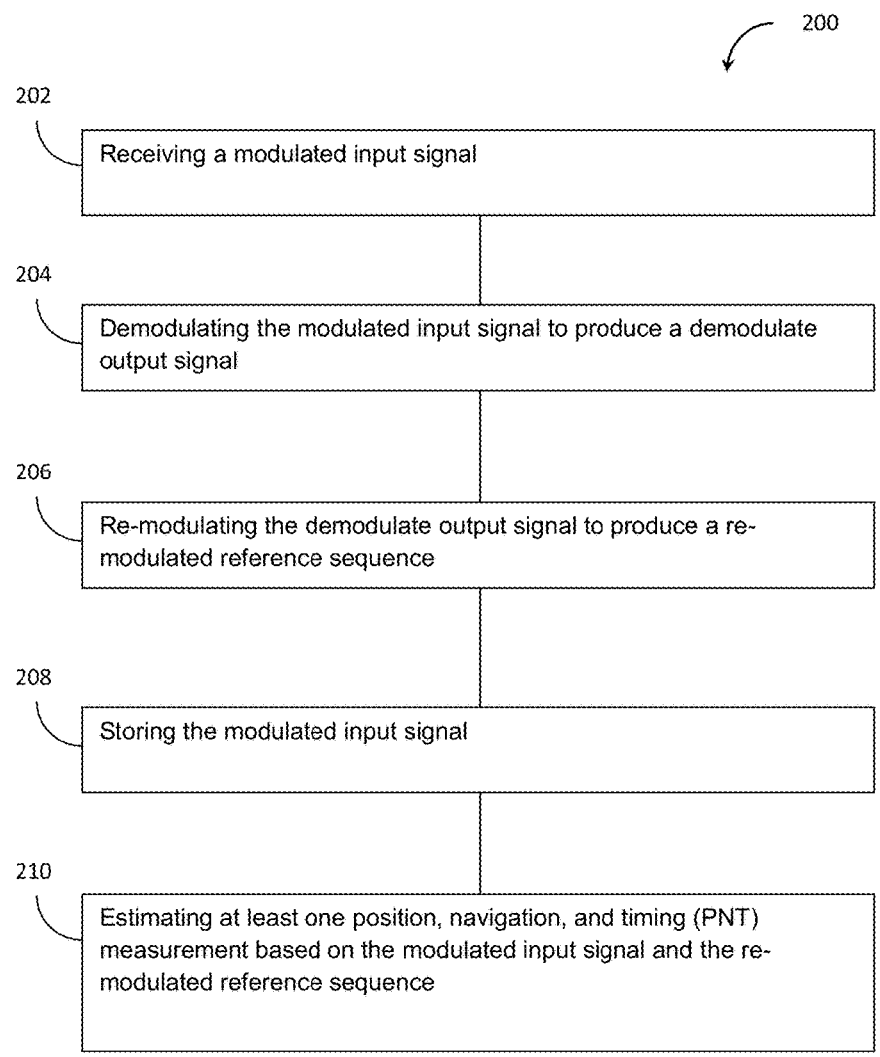
FIG. 2 is a flow diagram depicting a signal processing method configured to provide both communication functionalities and re-modulated reference sequence generation abilities.

Referring now to FIG. 2, a flow diagram depicting a method 200 for providing reference sequence re-modulation in a communication system is shown. As illustrated in FIG. 2, upon receiving an input signal in step 202, the received input signal is demodulated and processed in step 204 to produce information-bearing data bits in order to facilitate communication functionalities of the system. The successfully demodulated and decoded communication message generated in step 204 is then re-modulated in step 206 to produce a much longer reference sequence that satisfies a particular precision requirement (e.g., for PNT measurement purposes). As previously described, the communication message is re-modulated utilizing the same modulation process as the modulator that originally modulated the input signal received.

This re-modulated reference sequence can then be utilized for various purposes, including, for example, providing precise PNT estimations. As describe above, for PNT estimation purposes, the input signal received in step 202 is also stored in a storage device in step 208, and the re-modulated reference sequence produced in step 206 is correlated with the input signal stored in the storage device to produce high-precision PNT measurements in step 210. PNT measurements produced in this manner can be provided without imposing additional reference sequence overhead on the communication system.

Figure 3:
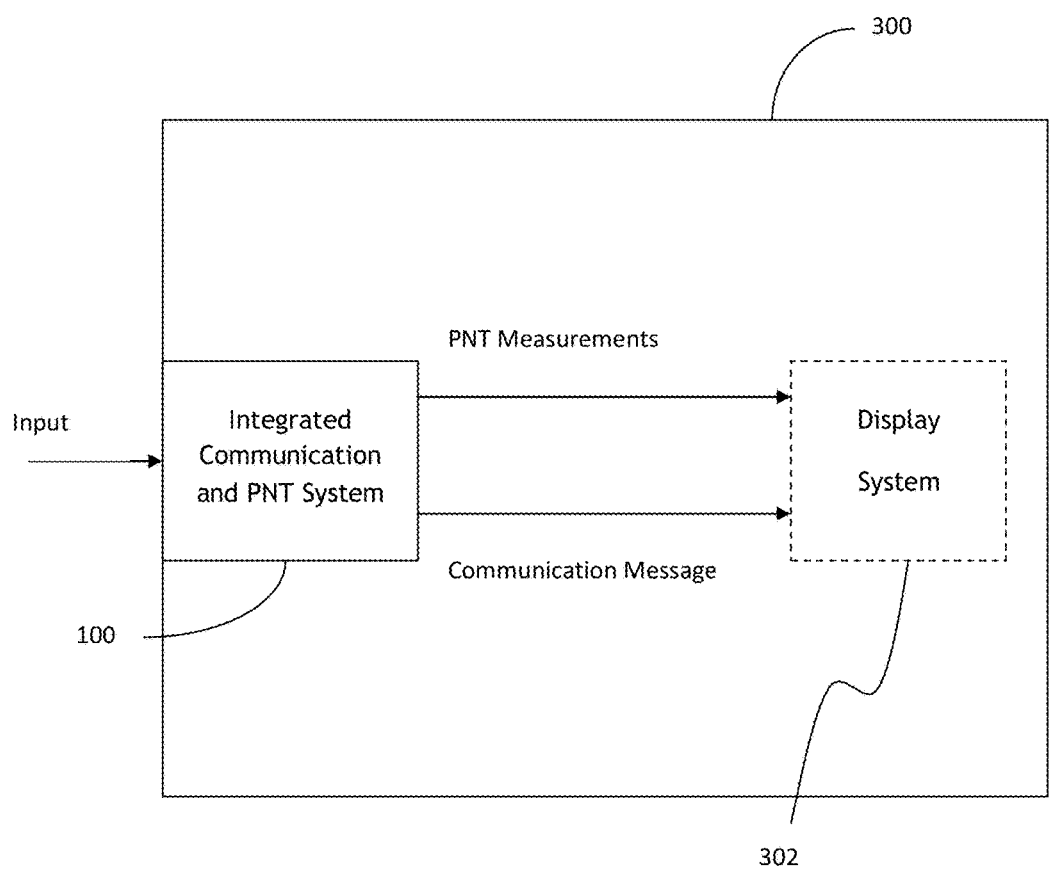
FIG. 3 is a block diagram illustrating signal processing device utilizing the integrated communication PNT system of FIG. 1.

It is contemplated that the method and system in accordance with the present disclosure can be incorporated into various types of receivers, transceivers, communication devices, or signal processing devices in general, as depicted in FIG. 3. It is understood that such a signal processing device 300 may be utilized in various communication platforms without departing from the spirit and scope of the present disclosure. Exemplary communication platforms may include, but not limited to, computing devices, network devices, radio devices, antenna devices, optical devices, cellular devices and the like. It is contemplated that such communication platforms may be utilized in stationary locations as well as mobile platforms (e.g., ground vehicles, aerial vehicles, maritime vehicles and the like).

For instance, in certain embodiments in accordance with the present disclosure, the signal processing device 300 may be in communication with, or configured as an integrated component of, a display system 302 that uses the PNT measurements to compute data, such as position and heading of a vehicle. It is contemplated the vehicle may be an aerial vehicle, a maritime vehicle, a land-based vehicle or the like. It is also contemplated that the display system may be include a projector such as a head-up display (HUD) projector, which refers to any transparent display that presents data without requiring users to look away from their usual viewpoints.

It is to be understood that the present disclosure may be conveniently implemented in forms of a software/firmware package. Such a software/firmware package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the present disclosure is not limited to any underlying implementing technology. The present disclosure may be implemented utilizing any combination of software and hardware technology. The present disclosure may be implemented using a variety of technologies without departing from the scope and spirit of the disclosure or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

It is believed that the present disclosure and many of its attendant advantages will be understood by the foregoing description, and it will be apparent that various changes may be made in the form, construction, and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A communication apparatus, comprising:
a communication data path, the communication data path including a demodulator configured to demodulate a modulated signal received at the communication apparatus and estimate at least one of: a coarse time-of-arrival (TOA) estimation, a coarse frequency-of-arrival (FOA) estimation, a coarse angle-of-arrival (AOA) estimation and a coarse phase-of-arrival (POA) estimation, the demodulator configured to remove a message that includes an error that made it through demodulation;
a modulator, the modulator configured to provide a modulation process in a same manner as a modulation process originally utilized to modulate the modulated signal received at the communication apparatus, the modulator further configured to receive a successfully demodulated and decoded output message from the communication data path and re-modulate the successfully demodulated and decoded output message to produce a re-modulated reference sequence utilizing the same modulation process originally utilized to modulate the modulated signal received at the communication apparatus;
a processor in communication with the modulator, the processor configured to estimate a position, navigation, and timing (PNT) measurement based on the re-modulated reference sequence produced by the modulator and the at least one of: the coarse TOA estimation, the coarse FOA estimation, the coarse AOA estimation, and the coarse POA estimation estimated by the demodulator; and
an error detection processor configured to determine whether a demodulated signal output from the demodulator contains an error and prevent the modulator from using the demodulated signal output to produce the re-modulated reference sequence when the demodulated signal output contains an error, wherein the modulator is configured to receive a plurality of sequential output messages from the communication data path and jointly re-modulate the plurality of sequential output messages which have been successfully received to produce the re-modulated reference sequence, the PNT measurement includes: a time-of-arrival (TOA) estimation, a frequency-of-arrival (FOA) estimation and an angle-of-arrival (AOA) estimation.

2. The communication apparatus of claim 1, further comprising:
a memory configured to store the modulated signal received at the communication apparatus.

3. The communication apparatus of claim 2, wherein the processor is in communication with the memory and the modulator, and wherein the processor is configured to estimate the PNT measurement based on the modulated signal stored in the memory and the re-modulated reference sequence produced by the modulator.

4. The communication apparatus of claim 3, wherein the processor is configured to estimate at least one of: a precise TOA estimation, a precise FOA estimation and a precise AOA estimation based on the modulated signal stored in the memory, the re-modulated reference sequence produced by the modulator, and at least one of: the coarse TOA estimation, the coarse FOA estimation, the coarse AOA estimation, and the coarse POA estimation provided by the demodulator.

5. An integrated communication and position, navigation, and timing (PNT) measurement system, comprising:
a communication data path, the communication data path including a demodulator configured to demodulate a modulated signal and estimate at least one of: a coarse frequency-of-arrival (FOA) estimation, a coarse angle-of-arrival (AOA) estimation and a coarse phase-of-arrival (POA) estimation;
a modulator, the modulator configured to provide a modulation process in a same manner as a modulation process originally utilized to modulate the modulated signal, the modulator further configured to receive a successfully demodulated and decoded output message from the communication data path and re-modulate the successfully demodulated and decoded output message to produce a re-modulated reference sequence utilizing the same modulation process originally utilized to modulate the modulated signal;
a processor, the processor configured to estimate at least one PNT measurement based on the modulated signal, the re-modulated reference sequence produced by the modulator, and at least one of: the coarse FOA estimation, the coarse AOA estimation, and the coarse POA estimation estimated by the demodulator; and
an error detection processor configured to determine whether a demodulated signal output from the demodulator contains an error and prevent the modulator from using the demodulated signal output to produce the re-modulated reference sequence when the demodulated signal output contains an error, wherein the modulator is configured to receive a plurality of sequential output messages from the communication data path and jointly re-modulate the plurality of sequential output messages which have been successfully received to produce the re-modulated reference sequence.

6. The system of claim 5, further comprising:
a memory configured to store the modulated signal for the estimation processing device.

7. The system of claim 5, wherein the at least one PNT measurement includes at least one of: a time-of-arrival (TOA) estimation, a frequency-of-arrival (FOA) estimation and an angle-of-arrival (AOA) estimation.

8. The system of claim 5, wherein the demodulator is further configured to provide a coarse time-of-arrival (TOA) estimation, and wherein the processor is further configured to estimate the at least one PNT measurement based on the modulated signal, the re-modulated reference sequence produced by the modulator, and the coarse TOA estimation.

9. A signal processing method, comprising:
receiving a modulated input signal;

demodulating the modulated input signal to produce a demodulated output signal and to provide at least one of: a coarse time-of-arrival (TOA) estimation, a coarse frequency-of-arrival (FOA) estimation, a coarse angle-of-arrival (AOA) estimation and a coarse phase-of-arrival (POA) estimation;

re-modulating the demodulated output signal to produce a re-modulated reference sequence if the demodulated output signal is successfully demodulated and decoded, wherein the demodulated output signal is re-modulated utilizing a same modulation process originally utilized to modulate the modulated input signal, wherein re-modulating the demodulated output signal further includes:

receiving a plurality of sequential demodulated output signals; and re-modulating the plurality of sequential demodulated output signals which have been successfully received in a joint manner to produce the re-modulated reference sequence;

estimating a position, navigation, and timing (PNT) measurement based on the modulated input signal and the re-modulated reference sequence and the at least one of: the coarse TOA estimation, the coarse FOA estimation, the coarse AOA estimation, and the coarse POA estimation;

determining whether a demodulated output signal contains an error; and preventing the re-modulated reference sequence from being produced utilizing a demodulated output signal that contains an error.

10. The method of claim 9, further comprising:
storing the modulated input signal.

11. The method of claim 9, wherein the PNT measurement includes: a time-of-arrival (TOA) estimation, a frequency-of-arrival (FOA) estimation and an angle-of-arrival (AOA) estimation.

12. The method of claim 9, wherein estimating the PNT measurement further comprises:

estimating at least one of: a precise TOA estimation, a precise FOA estimation and a precise AOA estimation based on the modulated input signal, the re-modulated reference sequence, and the at least one of: a coarse TOA estimation, a coarse FOA estimation, a coarse AOA estimation and a coarse POA estimation.

* * * * *